United States Patent [19]
Müller

[11] Patent Number: 5,988,735
[45] Date of Patent: Nov. 23, 1999

[54] INNER LINING FOR THE ROOF OF A MOTOR VEHICLE

[75] Inventor: Olaf Müller, Rüsselsheim, Germany

[73] Assignee: INOVA GmbH Technische Entwicklungen, Ruesselsheim, Germany

[21] Appl. No.: 08/910,926

[22] Filed: Aug. 8, 1997

[30] Foreign Application Priority Data

Aug. 9, 1996 [DE] Germany .................. 196 32 222

[51] Int. Cl.⁶ .................................................. B60R 13/02
[52] U.S. Cl. .................... 296/214; 280/728.2; 280/730.2
[58] Field of Search ........................ 296/214; 280/728.2, 280/730.2, 751, 730.1

[56] References Cited

U.S. PATENT DOCUMENTS

| | | |
|---|---|---|
| 3,897,961 | 8/1975 | Leising et al. ................. 280/730.1 |
| 4,610,478 | 9/1986 | Tervol ............................. 296/214 |
| 5,011,218 | 4/1991 | Danner et al. ................. 296/214 |
| 5,470,103 | 11/1995 | Vaillancourt et al. ........ 280/730.1 |
| 5,688,022 | 11/1997 | Adams et al. .................. 296/214 |
| 5,772,238 | 6/1998 | Breed et al. ............... 280/730.1 X |

FOREIGN PATENT DOCUMENTS

| | | |
|---|---|---|
| 0088931 | 9/1986 | European Pat. Off. . |
| 0694444 | 1/1996 | European Pat. Off. . |
| 19604055 | 8/1997 | Germany . |

Primary Examiner—D. Glenn Dayoan
Assistant Examiner—Chad D. Wells
Attorney, Agent, or Firm—Evenson, McKeown, Edwards, & Lenahan, P.L.L.C.

[57] ABSTRACT

An inner lining for a motor vehicle with a finished ceiling made of a self-supporting form piece attachable to the edge of the motor vehicle structure includes at least one air-bag which is premounted on the self-supporting form piece before the ceiling is installed in the motor vehicle.

11 Claims, 3 Drawing Sheets

INNER LINING FOR THE ROOF OF A MOTOR VEHICLE

BACKGROUND OF THE INVENTION

1. Field of the Invention

This invention concerns an inner lining for the roof of a motor vehicle that has a ceiling consisting of a self-supporting fitting which is attachable to the roof frame structure of the motor vehicle via an adhesive.

2. Description of Related Art

An inner lining of this type is known from EP 88 931 B1. This known inner lining consists of a prefabricated self-supporting finished ceiling made, for example, from a heat compressed material. Strip-shaped hardening elements or sprigs, which essentially extend over the total width of the inner lining and can consist of plastic strips, are formed into the basic material. Attachment means for attaching the finished ceiling to the motor vehicle structure in the area of the roof frame are provided at the sprig ends.

SUMMARY OF THE INVENTION

The object of this invention is to provide an inner lining of the type described above which facilitates the installation of passenger support systems in the motor vehicle.

This object is attained according to the invention by an air-bag arrangement which can be premounted into the finished ceiling before being installed in the motor vehicle.

The air-bag arrangement can be premounted into a carrier arrangement which is supported by the strip-shaped hardening elements (sprigs) of the finished ceiling. The carrier arrangement can consist of strip-shaped carriers (metal strips) attached to the hardening elements (sprigs) of the finished ceiling which extend across the longitudinal direction of the motor vehicle.

In this way, an integration of the air-bag devices into the finished ceiling is obtained before the same are installed in the motor vehicle. Once installed, the air-bag arrangements lie between the roof outer layer or the roof frame and the finished ceiling.

The air-bags can be essentially anchored along the full length of the strip-shaped carrier elements. In order to allow the air-bags to unfold inside the motor vehicle during filling, desired breaking points are provided on the finished ceiling which are opened when the air-bags are filled by means of the generated filling pressure.

BRIEF DESCRIPTION OF THE DRAWINGS

The invention will be explained in more detail with respect to the figures, wherein.

DESCRIPTION OF THE PREFERRED EMBODIMENTS

Figure 1:
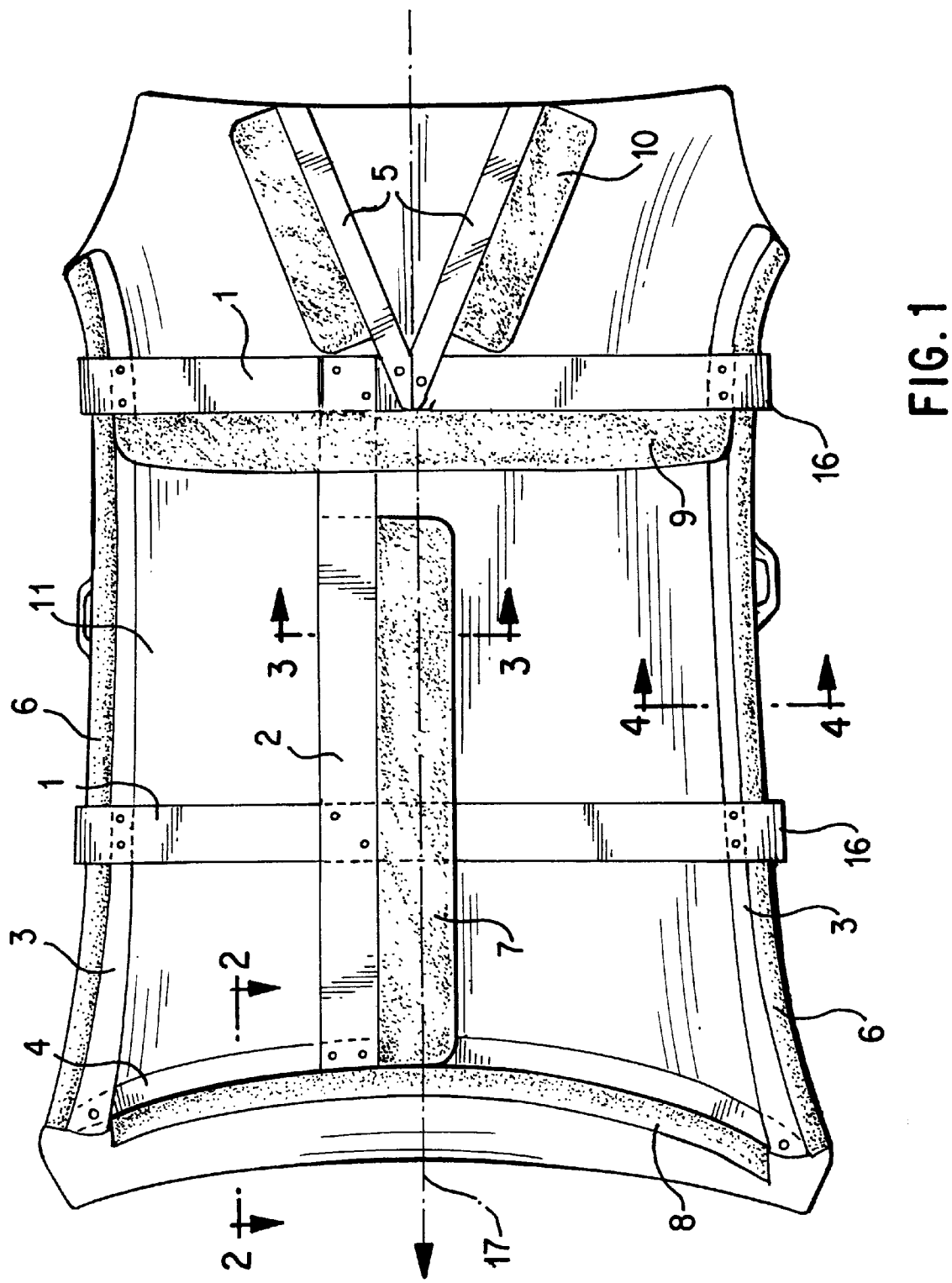
FIG. 1 shows a finished ceiling with different air-bag arrangements.

Two strip-shaped hardening elements or sprigs 1 are provided for hardening and pretensioning the represented finished ceiling onto the motor vehicle structure. The sprigs 1 possess protruding ends provided with attachment means 16, for example in the form of extenders, for fixing the finished ceiling 11 to the motor vehicle structure in a manner as shown, for example, in German patent application 196 04 055.8.

Attachment strips 3 are provided on the sprigs 1, which extend sideways in the longitudinal direction of the motor vehicle along the finished ceiling. An attachment strip 4 that extends diagonally relative to the motor vehicle direction is provided at the front end of the side attachment strip 3. The extension of this attachment strip 4 corresponds approximately to the extension of the roof frame of the upper edge of the windshield of the motor vehicle.

A further attachment strip 2 extends in the longitudinal direction of the motor vehicle and is displaced sideways a small distance with respect to a longitudinal middle plane 17. The attachment strip 2 is attached to the diagonally running front attachment strip 4 as well as to both sprigs 1.

Two other V-shaped attachment strips 5 are attached on the rear sprig 1. Both attachment strips 5 extend from the rear sprig 1 diagonally to the rear.

The attachment points, which like the sprig 1 can be made of metal (metal strips) or plastic, form a carrier arrangement in the form of an attachment framework for different air-bag arrangements 6 to 10. This attachment framework is supported by both sprigs of the finished ceiling 11.

In the exemplary embodiment, an air-bag arrangement 8 with an air-bag 15 which extends along the attachment strips 4 is attached to attachment strips 4. The air-bag 15 of this air-bag arrangement 8 is essentially anchored along its entire length to the attachment strip 4. When folded, the air-bag arrangement 8 adapts to the contour of the attachment strip 4 and, therefore, to the contour of the roof frame at the upper edge of the windshield of the vehicle. When the air-bag is filled, the desired break point 14 in the finished ceiling is opened due to the filling pressure that fills the air-bag 15, so that the air-bag 15 can expand downward into the inside of the motor vehicle, particularly for protecting the head against a collision. This is apparent from FIG. 2.

Figure 3:
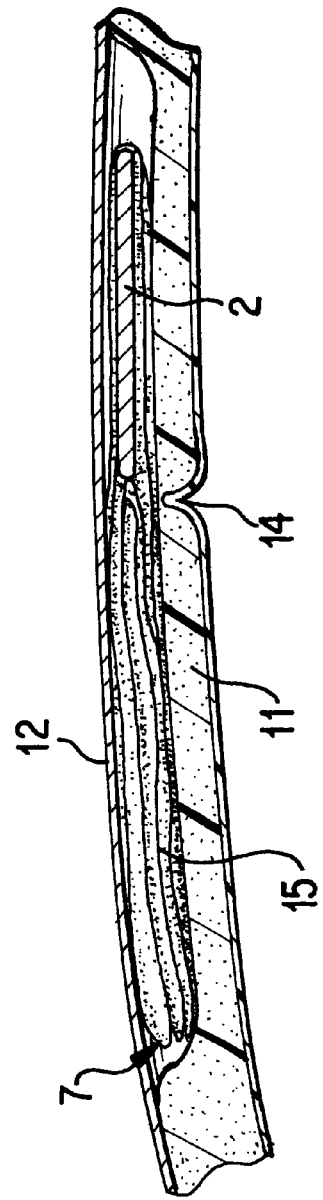
FIG. 3 shows a cross-sectional representation along a section line 3—3 of FIG. 1.

An air-bag arrangement 7 is attached to the attachment strip 2. The air-bag 15 of this air-bag arrangement, as shown in FIG. 3, is anchored along the total length of the attachment strip 2. The air-bag arrangement 7 extends, as shown in FIG. 1, essentially in the longitudinal direction of the motor vehicle and is located in the longitudinal middle plane 17 of the finished ceiling 11 or of the motor vehicle. When the air-bag is filled, also due to the filling pressure, a desired breaking point 14 provided in the finished ceiling 11 is broken through, so that the filled air-bag cushion can expand downward inside the motor vehicle. The filled air-bag cushion is arranged between the sitting positions at the height of the heads of passengers sitting in the front seats. A side head collision protection for two motor vehicle passengers sitting one beside the other is provided in the middle of the motor vehicle in this manner.

An air-bag arrangement 9 is also attached diagonally to the sprig 1 that runs along the motor vehicle longitudinal direction. This air-bag arrangement 9 serves as collision protection for passengers sitting in the back seats or rear bench of the motor vehicle. In a manner similar to the representation in FIG. 3, the finished ceiling 11 is equipped with a desired breaking point 14, so that an air-bag 15 of this air-bag arrangement can expand for protecting the passengers in the middle seat against a collision with the front seats of the motor vehicle.

Furthermore, a manner similar to the arrangement represented in FIG. 3, air-bag devices 10 are anchored on the attachment strips 5. These devices serve as side collision protection between the middle seat passengers sitting in the rear seat of the motor vehicle. The V-arrangement of the devices makes it possible for a third motor vehicle passenger, sitting between both air-bag arrangements 10 on the rear seat, to have side collision protection, particularly for the head area, on both sides with respect to the other motor vehicle passengers sitting next to the third passenger. The operation of the air-bag arrangement 10 is the same as the operations of the above-described air-bag arrangements.

Two side air-bag arrangements 6 are further provided. The side air-bag arrangements 6 run in the longitudinal direction of the motor vehicle and are anchored on the attachment strips 3 essentially along their total lengths. The configuration of the air-bag arrangements 6 results from the representations in section (section line A—A in FIG. 1) of FIG. 4. In this air-bag arrangement, an air-bag 15 corresponding thereto, extending essentially along the total length of the motor vehicle, that is, from column A to column C, is attached to the metal strips 3 that also extend along the total length of the motor vehicle (from column A to column B). The air-bag arrangement 6 is located below the attachment elements 16, which are constructed as described in German patent application 196 04 055.8. In this way, the air-bag arrangement 6 is arranged below the height of the handles of the attachment means 16. The air-bag arrangements 6, which extend particularly between the sitting positions of the front seat and the motor vehicle door, provide a side collision protection, particularly at the height of the head.

Figure 2:
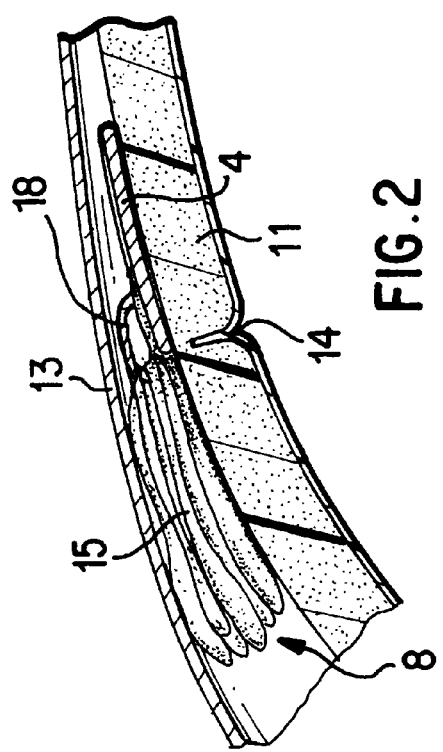
FIG. 2 shows a cross-sectional representation along a section line 2—2 of FIG. 1.
Figure 4:
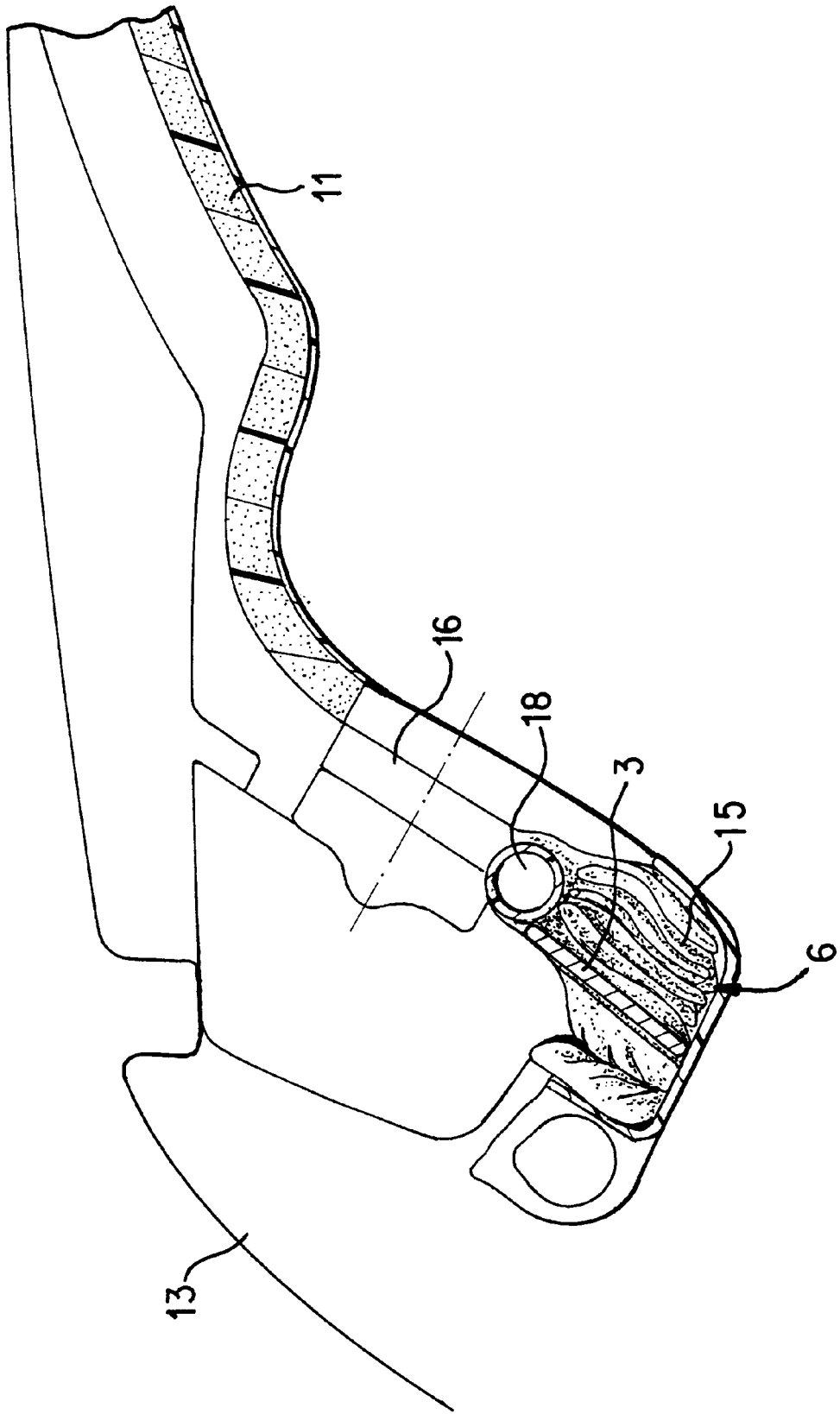
FIG. 4 shows a cross-sectional representation along a section line 4—4 of FIG. 1.

The air-bags 15 in the represented embodiments of the air-bag arrangements are positioned around the corresponding attachment strips 2 to 5 and are eventually glued to the same. Filling tubes 18 (FIG. 2, FIG. 4) extending along a longitudinal direction are provided for filling the air-bags as is known, for example, from the air-bag arrangement of EP 694 444 A2. These filling tubes can be connected to corresponding gas generators. In the normal or folded condition, the air-bag 15 is located between the finished ceiling 11 and the roof outer layer 12 or the roof frame 13, as can be seen in FIGS. 2 to 4. When there is a crash, as already explained, the desired breaking point 14, which extends also essentially along the total length of the air-bag arrangement in the finished ceiling, is broken through by the filling pressure. Each air-bag can unfold in the motor vehicle and can expand downward. The different air-bag arrangements are preferably built so that they can offer a side or front collision protection for the area of the head and, if needed, also the thorax region in the corresponding direction.

I claim:

1. An inner lining for a roof of a motor vehicle, having a finished ceiling attachable to a roof frame of the motor vehicle, said finished ceiling, before installation in the motor vehicle, comprising:

a self-supporting form piece which can be attached to the roof frame of the motor vehicle, at least one air-bag arrangement mounted on a carrier arrangement supported by at least one strip-shaped stiffening element of the form piece, said stiffening element extending transversely to a longitudinal direction of the motor vehicle after installation in the motor vehicle, and predetermined break points provided on the form piece which are to be opened by a filling pressure when filling a corresponding airbag of the at least one airbag arrangement.

2. An inner lining according to claim 1, wherein the at least one airbag arrangement is arranged above the form.

3. An inner lining according to claim 1, wherein the carrier arrangement includes strip-shaped carrier elements supported by at least two stiffening elements.

4. An inner lining according to claim 3, wherein the airbag arrangement has at least one airbag that can be supplied with filling gas and that is anchored over substantially its total length on one of said strip-shaped carrier elements.

5. An inner lining according to claim 1, wherein the length of each of the predetermined break points corresponds substantially to the length of a corresponding airbag.

6. An inner lining according to claim 1, wherein said at least one airbag arrangement is a side airbag arrangement including an airbag extending in a longitudinal direction of the motor vehicle when filled.

7. An inner lining according to claim 6, and further comprising attachment means which attach the finished ceiling to the roof frame, wherein said side airbag arrangement is located below said attachment means when said finished ceiling is attached to the roof frame of the motor vehicle.

8. An inner lining according to claim 1, wherein said at least one airbag arrangement is provided on a longitudinal middle plane of the motor vehicle when said finished ceiling is attached to the roof frame of the motor vehicle.

9. An inner lining according to claim 1, wherein said at least one airbag arrangement is provided in an area of a windshield of the motor vehicle when said finished ceiling is attached to the roof frame of the motor vehicle.

10. An inner lining according to claim 1, wherein said at least one airbag arrangement is is provided for protection of rear passengers of the motor vehicle when said finished ceiling is attached to the roof frame of the motor vehicle.

11. An inner lining according to claim 1, wherein said at least one airbag arrangement is provided for protection of a passenger sitting in the middle of a rear seat of the motor vehicle when said finished ceiling is attached to the roof frame of the motor vehicle.

* * * * *